United States Patent
Nimmala et al.

(10) Patent No.: US 9,282,551 B2
(45) Date of Patent: Mar. 8, 2016

(54) METHODS AND APPARATUS FOR AUTOMATED DEVICE STATE CHANGES IN RESPONSE TO NETWORK CONDITIONS

(71) Applicant: Apple Inc., Cupertino, CA (US)

(72) Inventors: Srinivasan Nimmala, Cupertino, CA (US); Longda Xing, San Jose, CA (US); Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 13/940,151

(22) Filed: Jul. 11, 2013

(65) Prior Publication Data

US 2014/0071905 A1    Mar. 13, 2014

Related U.S. Application Data (60) Provisional application No. 61/699,761, filed on Sep. 11, 2012.

(51) Int. Cl.
| | |
|---|---|
| *H04W 72/04* | (2009.01) |
| *H04W 28/18* | (2009.01) |
| *H04W 84/18* | (2009.01) |
| *H04W 28/06* | (2009.01) |
| *H04W 84/10* | (2009.01) |
| *H04L 29/06* | (2006.01) |

(52) U.S. Cl.
CPC ............ *H04W 72/042* (2013.01); *H04W 28/18* (2013.01); *H04L 29/06* (2013.01); *H04W 28/06* (2013.01); *H04W 84/10* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2003/0210676 A1* | 11/2003 | Wu | 370/350 |
| 2005/0169293 A1* | 8/2005 | Zhang et al. | 370/437 |
| 2005/0243762 A1* | 11/2005 | Terry et al. | 370/328 |
| 2005/0250512 A1* | 11/2005 | Zhang et al. | 455/453 |
| 2009/0097444 A1* | 4/2009 | Lohr et al. | 370/329 |
| 2010/0128663 A1* | 5/2010 | Kuroda et al. | 370/328 |
| 2011/0223904 A1* | 9/2011 | Fan et al. | 455/422.1 |
| 2013/0083756 A1* | 4/2013 | Pradas et al. | 370/329 |
| 2013/0176976 A1* | 7/2013 | Balakrishnan et al. | 370/329 |
| 2013/0329663 A1* | 12/2013 | Pelletier et al. | 370/329 |

* cited by examiner

*Primary Examiner* — Faruk Hamza
*Assistant Examiner* — Cassandra Decker
(74) *Attorney, Agent, or Firm* — Downey Brand LLP (57) ABSTRACT

Methods and apparatus for the automated altering of wireless device states in response to detected connection behaviors. In one embodiment, a mobile device receives network parameters, some of which are incorrectly configured, from a base station (or access point). To ensure the proper behavior of the mobile device, the device reviews the network provided parameters to determine if one or more of the parameters has been set incorrectly. If so, the device locally alters its own settings to mitigate the incorrect operation associated with the incorrect network provided parameters. In second exemplary embodiment, a number of tolerances are utilized to ensure the proper operation of the mobile device while maintaining an active link. Upon violation of one or more of these tolerances, the device breaks the active link to the wireless network.

13 Claims, 5 Drawing Sheets

METHODS AND APPARATUS FOR AUTOMATED DEVICE STATE CHANGES IN RESPONSE TO NETWORK CONDITIONS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The features described herein relate generally to the field of wireless networking. More particularly, in one exemplary embodiment, the features are directed to methods and apparatus for implementing automated device state changes in response to incorrect network settings.

2. Description of Related Technology

Wireless technologies offer users flexibility in that a user may often take one device and use it in many different networks. To achieve this widespread compatibility, these portable user devices typically support reconfiguration for use on different networks. Often, wireless networks provide a number of configuration parameters to the device over the network itself. During operation or prior to operation, the device receives these parameters and adjusts its settings accordingly.

As described in greater detail subsequently herein, in certain situations the network may provide parameters that are incorrectly set and/or outdated. As a brief aside, wireless technologies are designed to maximize limited (or locally limited) resources (e.g. battery resources, overlapping spectral resources, etc.). Inefficient allocation can cause unnecessary consumption or occupation of these limited resources without an increase in device performance, device reliability, or improved user experience. Moreover, inefficient resource utilization is highly undesirable because spectral resources are expensive to license. Further, in extreme cases, poor allocation of spectral resources may result in performance degradation and noticeably bad user experience for a given device, and in some cases, the nearby population of neighboring devices.

Consequently, new and improved strategies and architectures for optimizing network resource allocation and usage are needed. Ideal solutions should provide methods and apparatus for diagnosing incorrect network settings and/or mitigating performance degradation. More generally, solutions are needed for intelligently identifying and correcting unexpectedly poor performance.

SUMMARY

The apparatus and methods for, inter cilia, automated adjustment of wireless device states in response to detected connection behaviors are disclosed.

A method of managing operational states in a wireless device is disclosed. In one embodiment, the method includes: (i) receiving a plurality of network parameters from a base station, (ii) entering a connection state based on the plurality of network parameters, (iii) after entering the connection state, determining that a threshold value related to the connection state has been exceeded, (iv) in response to the determination, reviewing at least a portion of the plurality of network parameters to identify one or more incorrect network parameters, (v) altering a setting on the wireless device in response to the identification of the one or more incorrect network parameters, and (vi) based at least in part on the act of altering the setting, exiting the connection state.

A method of detecting incorrect state behavior in a mobile device is disclosed. In one embodiment, the method includes: (i) establishing a channel link to a base station apparatus, (ii) placing one or more data units in a transmit buffer associated with the channel link, (iii) monitoring a first time value, (iv) monitoring a second time value, and (v) if the first time value exceeds a first threshold concurrent with the second time value exceeding a second threshold, tearing down the channel link to the base station apparatus.

A user equipment device for use in a wireless communications network is disclosed. In one embodiment, the device includes: (i) a wireless interface and (ii) processing logic in data communication with the wireless interface. The wireless interface is configured to: (i) receive one or more network parameters from a base station apparatus associated with the wireless communications network, (ii) based on the one or more network parameters establish a transmission channel to the base station apparatus; and (iii) transmit one or more data units over the transmission channel. The processing logic is configured to run at least one computer program thereon. The at least one computer program includes a plurality of instructions configured to, when executed: (i) determine if a time threshold related to the transmission channel has been exceeded, (ii) if the time threshold is exceeded, review at least one of the one or more network parameters to identify at least one incorrect parameter, and (iii) based at least in part on the identification of the at least one incorrect parameter, alter one or more settings of the user equipment device related to the at least one incorrect parameter. The altered one or more settings allows the transmission of the one or more data units.

A non-transitory computer readable medium is disclosed. In one embodiment, the computer readable medium is configured to store a computer program. The computer program includes a plurality of instructions configured to, when executed: (i) receive a plurality of network parameters, (ii) establish a connection state based at least in part on the plurality of network parameters, (iii) after establishment of the connection state, monitor a value with an associated tolerance, (iv) if the value falls outside the tolerance; review at least a portion of the plurality of network parameters to identify one or more incorrect network parameters, (v) in response to the identification of the one or more incorrect parameters, alter a setting, and (vi) based at least in part on the alteration of the setting, exit the connection state.

A method for managing random access connection states in a wireless device is disclosed. In one embodiment, the method includes: (i) receiving, from a network connection apparatus, at least one a parameter related to a first maximum number of allowed random access request retries, (ii) determining a second maximum number of retries, the second maximum number of retries being associated with a time limit specific to the wireless device, (iii) determining if the first maximum number is greater than the second maximum number, and (iv) based at least on the second determination, reducing an allowed number of random access retries for the wireless device from the first maximum number to the second maximum number.

A method of managing operational states in a wireless device is disclosed. In one embodiment, the method includes: receiving a plurality of network parameters; evaluating at least a portion of the received plurality of network parameters to identify one or more incorrect network parameters; and adjusting one or more operational settings based at least in part on the evaluation, the adjusting mitigating or preventing at least one adverse operational behavior that would occur without the adjustment.

A user equipment device configured to manage operational states is disclosed. In one embodiment, the user equipment device includes: a wireless interface configured to: receive one or more network parameters from a network; based on the one or more network parameters, establish a connection to the network; and transact data over the established connection; a processor in communication with the wireless interface and a non-transitory computer readable medium. In one variant, the non-transitory computer readable medium including one or more instructions which are configured to, when executed by the processor: review at least a portion of the received one or more network parameters to identify one or more incorrect network parameters; and adjust one or more operational settings of the established connection.

A user equipment device configured to correct one or more undesired operational conditions is disclosed. In one embodiment, the user equipment device includes: logic configured to obtain a plurality of network parameters; logic configured to implement at least one of the received parameters; logic configured to identify one or more undesired operational conditions associated with one or more of the implemented at least one network parameter; and logic configured to adjust one or more operational settings based at least on the identified one or more operational conditions.

In one variant, the adjustment of the one or more operational settings includes adjusting one or more settings that are known a priori to cause the one or more operational conditions.

In another variant, the operational conditions include an unduly long period of connection maintenance.

In still another variant, the adjustment of the one or more operational settings includes comparing at least a portion of the obtained network parameters to a stored set of parameters.

A network apparatus for use in a wireless network is disclosed. In one embodiment, the apparatus includes a processor; a wireless interface in data communication with the processor; and a storage device in data communication with the processor, the storage device including a computer program. In one variant, the program is configured to, when executed: receive information relating to a mobile wireless device via the interface, the information relating to one or more undesirable operational behaviors relating to a wireless connection established with the mobile device via the wireless interface; evaluate the information to identify one or more prospective causes for the one or more behaviors; and cause implementation of corrective action for the one or more causes based at least on the identified prospective causes.

In one variant, the corrective action is implemented by the network entity with respect to one or more functions of the wireless connection with the mobile wireless device. In other variants, the corrective action is implemented by the mobile wireless device based upon information transmitted to the mobile device relating to the one or more prospective causes.

In some cases, the undesirable operational behaviors include radio frequency interference, and are identified by a second mobile wireless device operating proximate with the mobile wireless device.

A method of managing operational states in a user equipment (UE) connected to a High Speed Packet Access (HSPA) network is disclosed. In one embodiment, the method includes: receiving a plurality of network parameters at the UE, at least one of the parameters configuring a maximum medium access control (MAC) transport block size allowed under power limited conditions; evaluating at least a portion of the received plurality of network parameters to determine when the at least one parameter conflicts with a second parameter configuring a MAC transport block size; and adjusting one or more operational settings of a transmitter of the UE based at least in part on the evaluation, the adjusting enabling the transmitter to transmit at least one MAC transport block.

In one such exemplary variant, the at least one parameter includes a Minimum-Set-Enhanced Transport Format Combination Indicator (eTFCI) and the second parameter includes an Uplink (UL) Radio Link Control (RLC) Protocol Data Unit (PDU) size limitation. During operation, the evaluating includes determining when a maximum PDU size specified by the Minimum-Set eTFCI is less than the minimum PDU size specified by the UL RLC PDU size limitation, and adjusting one or more operational settings includes overriding the Minimum-Set-Enhanced Transport Format Combination Indicator (eTFCI). In some cases, the method may further include: terminating a connection state as part of the adjustment of the one or more operational settings.

In some variants, evaluating includes evaluating the at least portion of received parameters against corresponding ones previously saved in a data structure of the UE. Alternately, evaluating may include evaluating the at least portion of received parameters against corresponding tolerance values previously saved in a data structure of the UE. Certain variants may also adjust a time-out parameter related to an operational state.

A method of managing operational states in a mobile wireless device is disclosed. In one embodiment, the method includes: receiving information relating to the mobile wireless device, the information relating to one or more undesirable operational behaviors relating to a wireless connection established between the mobile wireless device and a network; evaluating the information to identify one or more prospective causes for the one or more behaviors; and causing implementation of corrective action for the one or more causes based at least on the identified prospective causes.

In one variant, the information includes one or more parameters of the network; and evaluation of the one or more parameters includes comparing the one or more parameters to an acceptable threshold. In a similar variant, the information includes one or more performance metrics of the mobile wireless device; and where evaluation includes identifying one or more incorrectly configured parameters of the network.

Other features and advantages will immediately be recognized by persons of ordinary skill in the art with reference to the attached drawings and detailed description of exemplary embodiments as given below.

All Figures © Copyright 2012 Apple, Inc. All rights reserved.

DETAILED DESCRIPTION

Reference is now made to the drawings, wherein like numerals refer to like parts throughout.
Overview The present disclosure provides, inter alia, methods and apparatus for network resource allocation in a wireless network such as e.g., a cellular network.

Consider an exemplary scenario where a mobile device receives operational parameters from a network, which may include one or more incorrectly configured parameters. During operation, the device operates according to the specified parameters (including any improperly configured parameters). In some cases, incorrect configuration can cause the mobile device to behave incorrectly (e.g. maintaining a particular state for an undue amount of time, overuse of power resources, and/or under utilization of transmission resources, etc.). Accordingly, in one exemplary embodiment, the device determines if any parameters have been configured incorrectly. When such a parameter is detected, the device may, depending on circumstances, adjust its own settings to mitigate performance degradation that could possibly result from the incorrect configuration.

In one implementation, the mobile device monitors its performance to detect when any aberrant behavior exists. For instance, a set of performance metrics are monitored to ensure that performance does not fall outside acceptable tolerances. When performance requirements are not met, the device determines if it has been configured with incorrect network parameters.

DETAILED DESCRIPTION OF EXEMPLARY EMBODIMENTS

Exemplary embodiments are now described in detail. While these embodiments are primarily discussed in the context of wireless communications networks, the general principles and advantages may be extended to other types of communication networks, whether wireline or wireless.

Figure 1:
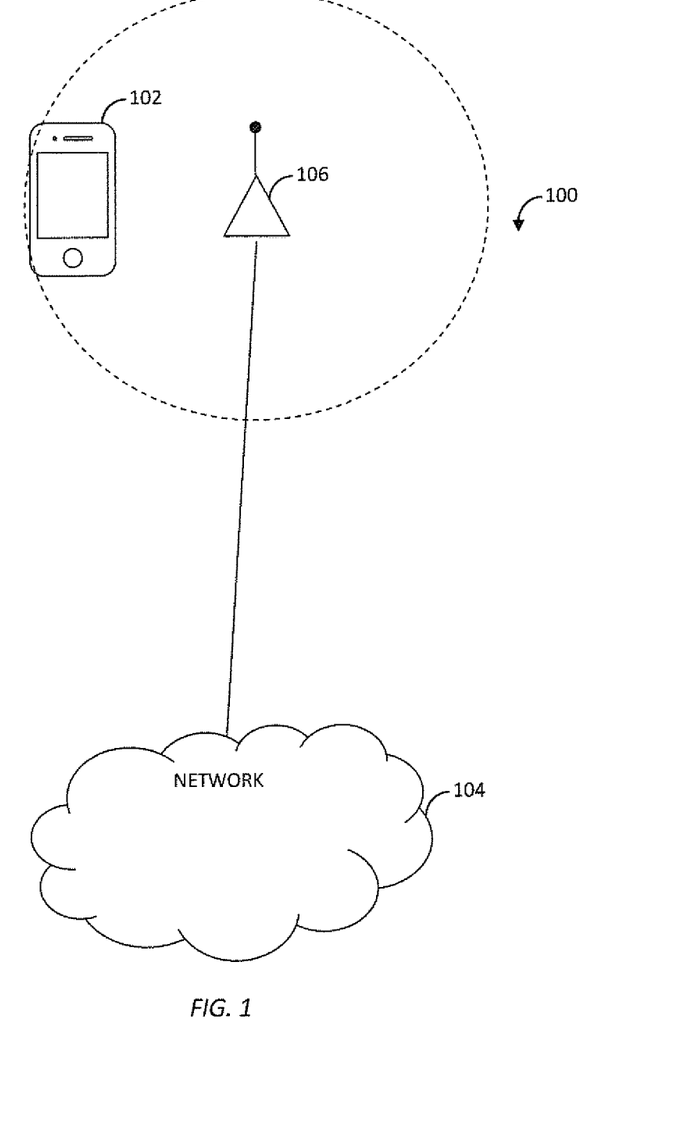
FIG. 1 is functional block diagram of one exemplary network architecture useful in conjunction with various disclosed features.

In light of the present disclosure, it will be apparent to those skilled in the art that the disclosed features address general issues with aberrant mobile device behavior. Various implementations and/or modifications may be readily adapted to correct such behavior by those of ordinary skill in the related arts given the contents of the present disclosure, even in situations in which the root cause of the device behavior is unknown.
Exemplary Network Architecture FIG. 1 shows a functional block diagram of one exemplary embodiment of a network architecture 100. A device 102 establishes a data connection with a wireless network 104 via a base station (or access point, etc.) 106. In the context of FIG. 1, the wireless network may include cellular technologies (e.g., Long Term Evolution (LTE) and LTE-Advanced (LTE-A), Global System for Mobile Communications (GSM), General Packet Radio Service (GPRS), Enhanced Data Rates for GSM Evolution (EDGE), Universal Mobile Telecommunications System (UMTS), High Speed Packet Access (HSPA), Interim Standard 95 (IS-95), Code Division Multiple Access 1Xtreme (CDMA-1X), CDMA-2000, etc.), high-speed wireless networks (e.g. 802.16 (WiMAX)), wireless local area network technologies (e.g. 802.11 a/b/g/n/v/2012 (Wi-Fi)), and personal area networks (e.g. Bluetooth® and/or 802.15 (PAN)).

During normal operation, the network 104 and/or base station 106 manages various aspects of device 102 operation so as to maximize spectral resource utilization. For example, the base station may control physical and medium access control (MAC) parameters such as e.g., resource allocations, operational modes, maximum transmission power, etc. The network may control transport and network parameters such as e.g., quality of service (QoS) agreements, authentication and authorization schemes, etc. Prior art mobile devices responsively configure themselves according to the provided parameters.

In recent history, the rapid growth in new network technologies and scattered deployments of new technologies among legacy network installations has resulted in certain networks being incorrectly configured for device operation. Specifically, anecdotal evidence indicates that during incremental network upgrades, the network operators may not properly configure either: (i) the upgraded equipment in view of the existing legacy equipment, and/or (ii) the legacy equipment in view of the upgraded equipment.

For instance, consider a mobile device which moves into a network that supports High Speed Packet Access (HSPA) but which has not configured its Minimum-Set-Enhanced Transport Format Combination Indicator (eTFCI) or, alternately, the network has configured the Minimum-Set-eTFCI incorrectly (e.g., below the configured Uplink (UL) Radio Link Control (RLC) Protocol Data Unit (PDU) size for that bearer). As a brief aside, when selecting an eTFCI, the mobile device (or user equipment (UE)) Medium Access Control layer software ensures that the power headroom available for the Enhanced Dedicated Channel (eDCH) Dedicated Physical Data Channel (E-DPDCH) transmission meets the power requirement of the given Enhanced Transport Format Combination (eTFC). However, this requirement is exempted for all eTFCs that are less than or equal to the configured Minimum-Set-eTFCI. Thus, if the mobile device blindly configures itself according to the network's indicated Minimum-Set-eTFCI or uses its default eTFCI (a null value), the mobile device may not be able to transmit even a single RLC PDU since the Minimum-Set-eTFCI (and the corresponding exempted eTFCs) is smaller than the UL RLC PDU size.

Furthermore, existing retransmission diagnostics of the RLC layer of the device require at least one PDU transaction. In fact, RLC layer diagnostics are not active until at least one PDU is transmitted. Since existing diagnostics will not indicate any errors, the mobile device is also unable to determine that a problem exists; consequently, the device can be held in a deadlocked condition for long periods of time. In some implementations, the eDCH state consumes more power than other states, which results in a rapid draining of the device's limited battery resources.

Figure 2:
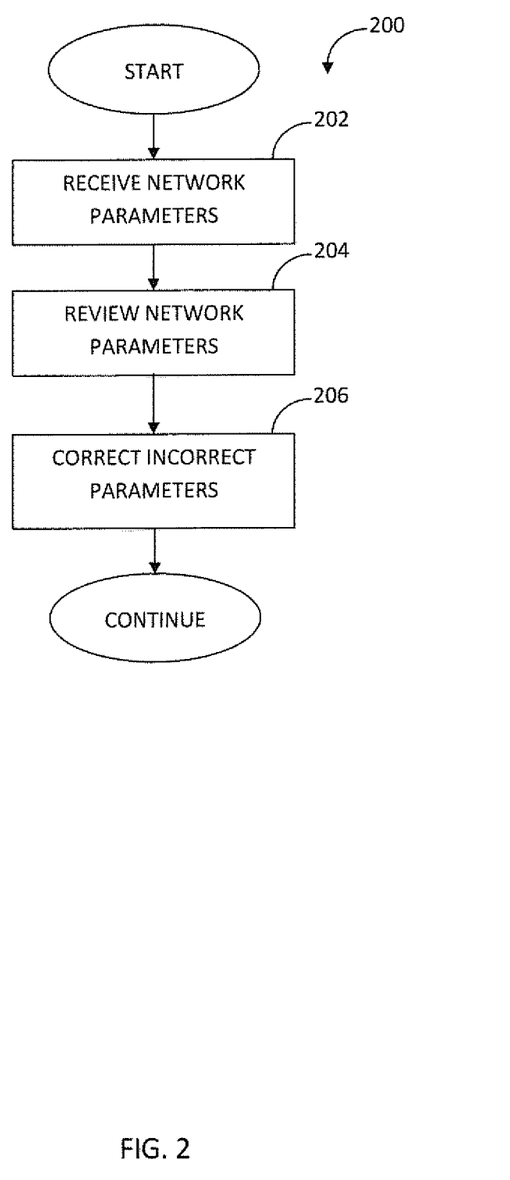
FIG. 2 is a logical flow diagram illustrating one embodiment of a generalized method for connection state management in accordance with various disclosed features.

Consequently, where the network provides parameters that are incorrectly set or outdated (especially during connection establishment and initialization), the mobile device can experience significant degradation in performance and user experience.
Methods FIG. 2 illustrates one embodiment of a generalized method 200 for managing state behavior in a wireless device.

At step 202 of the method 200, the wireless device receives one or more parameters from the network. One exemplary Radio Bearer Setup Message is provided in APPENDIX A. Generally, these received parameters are used to setup various network specific settings on the wireless device, and may include but are not limited to e.g. modulation and coding scheme, data unit size, resource allocations, operational modes, maximum transmission power, quality of service (QoS) agreements, authentication and authorization schemes, etc. It is appreciated that the wireless device may procure these operational parameters at different stages of operation. For example, the wireless device may receive parameters upon entering a network (e.g., as part of a basic control message, etc.). In other examples, the wireless device may query the network for parameters e.g., to change operational modes, etc. In still other embodiments, the wireless device may have received the parameters previously (e.g., while in a different geographic area, etc.), or upon initial setup or activation. The parameters may be "pushed" to the device (e.g., from a network server), or "pulled" (e.g., upon device request), or even transferred at request of a proxy (or relayed to a proxy and then sent to the device therefrom, such as upon request from the mobile device or push from the proxy).

Thereafter, the wireless device enters a connection state based on the provided parameters. The connection state may include the step of establishing an active link between the wireless device and the network, or alternately may re-use an existing active link. In one such embodiment, the active link includes a dedicated channel (DCH) for data transmission. In other embodiments, the active link may include generating data traffic on a shared channel, and/or collision-based network channel. Maintaining the active link occupies spectral resources and consumes power resources. However, a connection state is generally required to initiate and/or participate in data traffic and transactions. Ideally, the wireless device should seek to minimize connection time when unnecessary, and/or exit the connection state when no data can be transmitted (or received), or when network conditions do not permit data traffic. Traditionally, the device and network coordinate connection state entry and exit with synchronized peer state machines.

In some embodiments, the wireless device monitors one or more performance metrics to verify that the connection state is operating within acceptable tolerances. In one variant, the device compares the monitored performance metrics against one or more thresholds. Threshold criteria can be used to flag aberrant state behavior when the performance metric has risen above a maximum threshold, or alternatively fallen below a minimum threshold. Such thresholds may be optimized for a wide array of considerations including, without limitation, performance, power consumption, network congestion, device limitations, user requirements/preferences, etc. Overly conservative thresholds may result in excessive false alarms, whereas overly liberal thresholds may result in unresponsive behavior and longer deadlocked states. In other variants, patterns of behavior or activity (or lack thereof) are evaluated and used as a trigger condition.

In an exemplary implementation, the device monitors the length of time that the device maintains the active link. For example, if the device has been in the connection state for a long period of time, the device may be in a deadlocked state. Consider the example scenario where the device starts a timer when the active link is established. The timer increments (or decrements) while the link is active. It the active link is dropped or restarted, the device resets the timer. If the time value increments above a certain threshold count (or decrements down to zero), the device alerts an application running on the device that a time-out period has elapsed. In one alternate, the device alerts a network-side entity (e.g., base station) which is tasked with implementing diagnostic or corrective action (e.g., terminating a latent connection state from its end). In another alternate, the mobile device provides the network entity with information regarding the problematic behavior or performance metrics (e.g., overly long connection, excessive battery drain rate, etc.), and the network entity evaluates the information to identify one or more potential causes. These identified causes can then either be used as the basis of the network entity instituting corrective action, or the network entity providing the mobile device with the list of possible causes for the latter to use in implementing corrective action(s).

In some variants, timer expiration does not necessarily cause the device to abort operation; rather, the timer expiration indicates that incorrect operation may be occurring or may have occurred, and that further diagnostics should be executed to more clearly determine whether such incorrect operation is in fact occurring (or has occurred).

In other embodiments, the device monitors a time-averaged data rate. In one implementation, the device monitors the amount of data traffic on an active link over a given length of time. If traffic falls below a certain activity level for a prescribed time period, a problem with the active link may have occurred. Alternately, a low time-averaged data rate may indicate that the resources consumed/occupied by the active link could be better utilized for other applications and/or devices.

In one variant, the threshold level is based on the amount of resources required for the link (e.g. frequency bands occupied, transmit power required, etc.). In another variant, the threshold level is based on requirements of the particular application of the device (e.g. quality of service requirements, bandwidth requirements, etc.). In still another variant, the threshold level is based on a lack of traffic within a prescribed time interval.

In yet other embodiments, the device monitors a resource consumption/occupation. In some cases, operation of the wireless device warrants attention when the resource requirements exceed normative levels, or are inadequate for normal operation. For example, certain types of data transactions are maintained with a minimal active link for extended periods (e.g. to reduce setup latency, or reduce resource costs/logistical issues associated with random access, etc.); thus, if the active link consumes more resources than necessary, the process should be flagged.

In some implementations, possible error conditions are not checked until a detected behavior or condition warrants further investigation (e.g. when the battery life is low, substantial interference is detected, etc.), thereby providing an indirect indication of a problem. For example, consider a device characterized by typical transmissions that deplete the battery and generate inference at relatively low rates, and where large spikes (in either power consumption or interference) indicate aberrant behavior. For such a device, diagnostics to identify the particular cause of the problem are only needed when a spike (e.g., transmission power) is detected.

Those of ordinary skill in the related arts will recognize that the foregoing monitoring assists in the detection of incorrect behavior and/or the possibility of incorrect state operation. In light of the present disclosure, it will be apparent to those skilled in the art that these and other threshold tests may be combined or used in a complementary fashion to further improve reliability of detection and reduce false positives (e.g. total time maintaining an active link and transmitted power exceeding a certain level, etc.). Further, the threshold and other tests described above are merely illustrative; those of ordinary skill may readily incorporate other tests or measures given the contents of the present disclosure.

At step 204, the wireless device reviews one or more parameters received from the network to verify that the parameters are within acceptable values for the device.

As previously noted, anecdotal evidence suggests that certain legacy networks may use incorrect or outdated parameters that can cause incorrect device function. For example, existing networks may provide a Minimum-Set-eTFCI (Enhanced Transport Format Combination Indicator) that contradicts existing Radio Link Control (RLC) Protocol Data Unit (PDU) settings (e.g., resulting in selection of an Enhanced Transport Format Combination (eTFC) that is smaller than the minimum PDU size), or in some cases the network may not provide an Minimum-Set-eTFCI at all (which causes the device to default to a null zero (0) value). If the eTFC is smaller than the minimum PDU size, then the device cannot transmit any PDUs on its assigned eDCH. Since the device only determines error conditions based on transmission characteristics (i.e. success or failure of a transmission), then these incorrect parameters can trap a device into a deadlock condition.

Accordingly, in one exemplary embodiment, the device can avoid deadlock states and undesirable operation by reviewing the one or more parameters (step 204) to ensure they comply with acceptable values and/or do not conflict with rules or other parameters. In some embodiments, the device compares the parameters provided by the network to a database or library of values stored on the device (e.g., installed at manufacture, downloaded at initiation, etc.). In some variants, the library contains a list of tolerances for each parameter that are acceptable to the device. The device identifies any provided values that fall outside acceptable tolerances. In another variant, the library only contains tolerances for parameters that have been previously known to cause incorrect operation of the device when configured incorrectly. "Learning" library variants can provide suitable protection from deadlocked states, without excessively complicating device and network implementations, and/or device and network interactions.

Alternately, in some variants, the device compares the parameters provided by the network to a set other parameters and/or rules stored on the device or provided by a network. Common examples of these conflict checks can include e.g., verifying that a maximum threshold is not less than a minimum threshold (or vice versa), a parameter or derived parameter is not over or under constrained, a parameter falls within practical bounds, a parameter has not changed excessively from a previous value, a parameter has changed when change is expected, etc.

In some cases, the network provides all parameters that may be used by the device at the initiation of the connection, during initial registration, etc. In these cases, the device may review all parameters (or all potentially disruptive parameters) at once. In other cases, only a subset of the network provided parameters apply to the device, the device's configuration, and/or the network conditions. For example, network parameters for good connectivity may differ from parameters for weak connectivity. Conditional parameters may be reviewed and/or corrected on an as-needed basis.

Similarly, certain networks only provide parameters on an as-needed basis. In these cases, the device may limit its review to provided parameters as they are received, or as they are used (or referenced). Alternatively, the device queries the network for parameters and/or parameter updates (regardless of their current applicability). This alternative may be applied in situations in which the incorrect behavior of the device may be common in certain conditions. For example, the device may query the network for parameters for a low-connectivity state even when the device is in a high-connectivity state. In this manner, the device can maintain proper function over a broad range of connectivity. In another such example, the network and device may have lost state synchronization; such synchronization loss scenarios may require that the device query the network for proper parameters to correct the state mismatch.

At step 206, the device adjusts and/or corrects incorrect parameters found during the review process. In some embodiments, the device alters any settings affected by incorrect network parameters, regardless of any current usage. Alternatively, the wireless device changes incorrect parameters linked directly to an identified current device malfunction or incorrect operation. By limiting parameter adjustment to current operation, the device can dynamically adjust behavior on an as-needed basis as opposed to unilaterally adjusting parameters (and perhaps causing problems at a later date when that parameter is used).

Moreover, it should be appreciated that in some cases, the network checks for operational compliance among its associated client devices. In such networks, overly aggressive adjustment of parameters may cause the client device to be excluded from the network (e.g., forced to disconnect, rejection of transmissions/packets, etc.). While the present disclosure is primarily concerned with networks which have been inadvertently incorrectly configured, it is appreciated that some networks may intentionally disable network capabilities by programming incorrect configurations. Accordingly, the device may further include historic information to comply with such networks, and/or improve operation. For example, the device may recognize networks which enforce non-compliant exclusion, based on e.g., historic connection information. Similarly, the device may store performance data for instances where adjustment to network parameters did not yield performance gains. In either of these cases, the device may defer to the provided network parameters rather than attempting to adjust the parameter(s).

In yet other embodiments, the device changes its settings in response to identified incorrect parameters and the detection of incorrect operation. The combination of factors can ensure that changes are only made when a problem is detected and a proximate cause is found, rather than reacting to the occurrence of either singularly (and perhaps inducing problems that do not presently exist).

Thereafter (i.e., upon completion of step 206 of the method 200), the device evaluates the connection state. In some embodiments, in order to ensure that the connection state reflects the updated settings, the device exits the connection state and (if necessary) restarts operation with the new settings. For example, if the device determines that it cannot transmit the contents of a transmit buffer without adjusting its configuration, the device suspends ongoing transmit operations, adjusts its parameters and resumes transmit operation. In some variants, this can be done without network synchronization. In other variants, the device may notify the network of its actions. Thereafter, the device monitors the resumed connection state in accordance with the method 200. In yet other variants, the mobile device may signal the network to accomplish the connection state adjustment/change.

In some embodiments, the device may continue to monitor the active link to determine if the parameter adjustments were effective. If performance is acceptable, then the device can continue operation. Alternatively, if performance is unaffected or continues to deteriorate, then the device may disconnect, and search for a new base station or network. In some variants, the device may attempt to reconnect to the same network one or more times to ensure that the performance is actually due to a network incompatibility (as opposed to an intermittent problem such as a radio frequency fade or environmental condition/disturbance).

While the foregoing method 200 is presented in view of active link maintenance, those of ordinary skill in the related arts will recognize, when given the contents of the present disclosure, that various principles may be applied to other processes. Common examples of network operations which can be incorrectly configured include without limitation, random access operations, connection establishment, authorization procedures, authentication procedures, etc.

Exemplary Device Configuration

Figure 3:
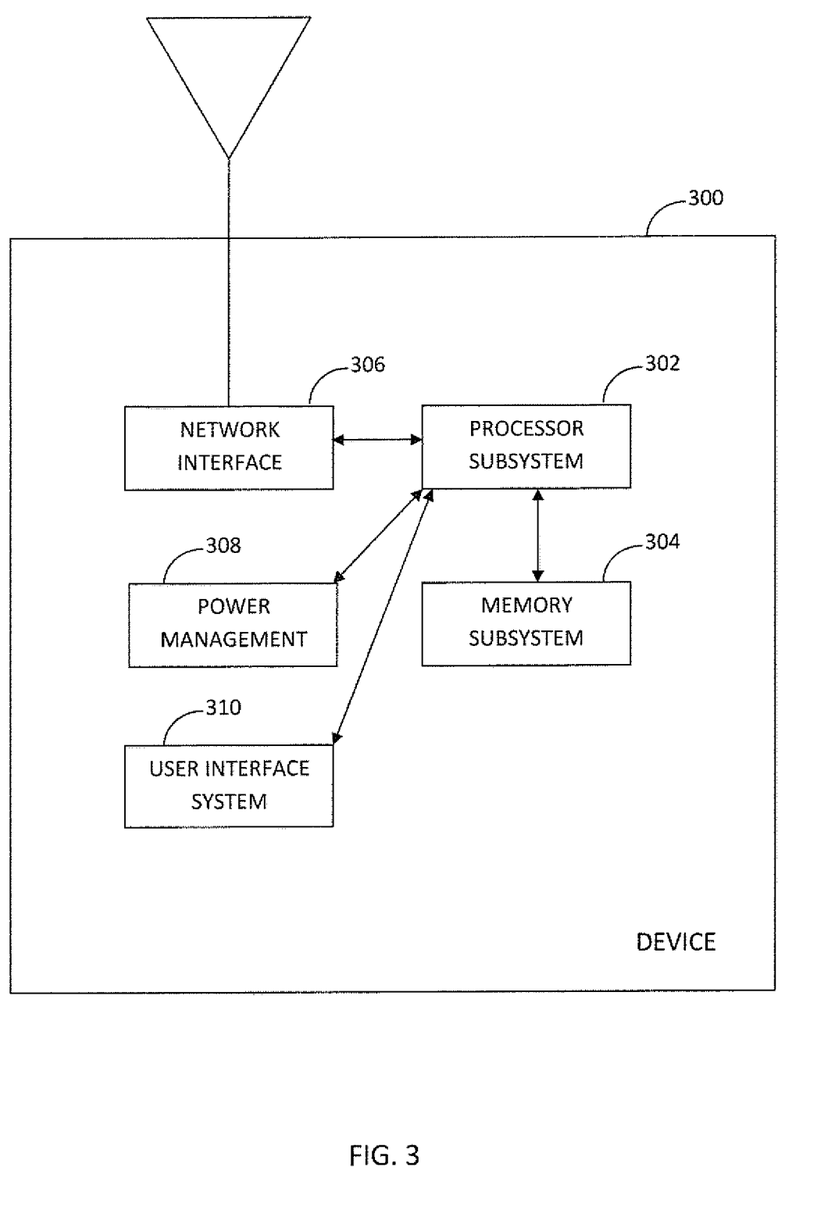
FIG. 3 is a functional block diagram illustrating one embodiment of a device configured to identify and correct connection state in accordance with various disclosed features.

Referring now to FIG. 3, an exemplary embodiment of a device 300 is illustrated. It will be recognized that while the following discussion is cast in terms of a mobile battery-powered wireless device (e.g., cellular telephone, smartphone, or tablet computer), the various principles may be applied to literally any type of device.

The exemplary device 300 includes a processor subsystem 302 such as a digital signal processor, microprocessor, field-programmable gate array, or plurality of processing components mounted on one or more substrates. The processing subsystem may also include an internal cache memory. The processing subsystem 302 is connected to a memory subsystem 304 including memory which may for example, include SRAM, flash and SDRAM components. The memory subsystem may implement one or a more of DMA type hardware, so as to facilitate data accesses as is well known in the art. The processor is configured to, inter alia, execute non-transitory computer-readable instructions that are stored within the memory subsystem.

Furthermore, the illustrated memory subsystem 304 includes an internal database and/or library configured to store e.g., a number of tolerances for monitored values, timer values, field values, etc. In one exemplary embodiment, the memory subsystem includes a set of network parameter value tolerances or ranges for comparison with the parameter values provided by a network. In more complicated embodiments, the database may store sets of invalid or likely invalid operational or equipment conditions. For example, a low data rate may not indicate a connection problem on its own; however, a low data rate in combination with a large pending transfer queue would indicate a likely connectivity issue.

In some implementations, the memory subsystem 304 includes one or more intelligent algorithms embodied within non-transitory computer-readable and executable instructions. Common examples of intelligent algorithms include for example: rules engines which check for one or more conditional rules to determine appropriate parameters, optimization engines which perform multi-variate analysis to determine an optimal set of parameters, algorithms to proceed through a hierarchy or diagnosis "tree" for identification of problems, etc. In one embodiment, the intelligent algorithms receive one or more monitored values, timer values, field values, etc. and one or more network parameters. Based on the expected performance, the algorithm determines if the network provided parameters are incorrectly configured (e.g., by evaluating whether performance has fallen below acceptable levels, etc.).

In addition, the processor subsystem 302 may further execute a management application to receive updated network parameter tolerances from the device manufacturer, a network administrator, or a third party. For example, if the device is unable to determine appropriate operation in certain situations, it may request and/or receive assistance in determining proper parameters. In other embodiments, the device may provide performance metrics back to the network to assist in trouble-shooting, and/or network maintenance. In some cases, performance logs can be provided at a later time, such as when the device returns to normal operation, according to a periodic reporting schedule, during device updates/upgrades, etc.

The memory subsystem 304 may also include a database for storing historic information. For example, the device may store network identifications and e.g., historic connection information. In other examples, the device may store certain historic parameter adjustments and historic connection information. Historic information may be combined with the aforementioned parameter libraries and/or intelligent algorithms improve performance and/or avoid unnecessary adjustments.

Moreover, those of ordinary skill in the related arts will recognize that variants of the foregoing algorithms or functions of the present disclosure may be further implemented within hardware logic. Logic can be configured to perform a wide variety of concurrent and/or sequential tasks.

Referring back to FIG. 3, the exemplary network interface 306 includes a radio modem. The radio modem generally includes a digital baseband, analog baseband, TX frontend and RX frontend. The apparatus 300 further includes an antenna assembly that includes a plurality of switches for enabling various antenna operational modes, such as for specific frequency ranges, or specified time slots. In certain embodiments, some components may be obviated or may otherwise be merged with one another as would be appreciated by one of ordinary skill in the art given the present disclosure. In one exemplary configuration, the radio/modem subsystem is configured to, inter alia, transmit and receive radio frequency (RF) in compliance with High Speed Packet Access (HSPA). Other common examples of cellular network standards include, but are not limited to: Global System for Mobile Communications (GSM), General Packet Radio Service (GPRS), Enhanced Data Rates for GSM Evolution (EDGE), Universal Mobile Telecommunications System (UMTS), Long Term Evolution (LTE) and LTE-Advanced (LTE-A) cellular network standards, Interim Standard 95 (IS-95), Code Division Multiple Access 1Xtreme (CDMA-1X), CDMA-2000, etc. In addition, the radio modem may also include wireless local area network capabilities (e.g. Bluetooth transceivers, Wi-Fi (IEEE Std. 802.11) transceivers, WiMAX (IEEE Std. 802.16e, etc.).

In one embodiment, the radio modem includes a state machine having at least one connection state. The connection state is configured to establish a connection to another wireless device (e.g., a peer device, a server device, etc.). In some implementations, the connection is an active link with a dedicated channel (DCH) for data transmission. In one such variant, the device includes multiple connection states with different requirements; for example, a first legacy dedicated channel (DCH) state, and a second enhanced DCH (eDCH) state. Other common examples of connectivity states include e.g., idle states, paging states, limited access states, measurement states, etc.

The radio modem may further include monitoring logic. Common examples of monitoring logic include sensors, software processes, error detection logic, etc. In one such variant, the monitoring logic is configured to identify when a performance metric exceeds (or falls below) an acceptable threshold. For instance, the device may monitor a power consumption, bit error rate, packet error rate (e.g., BER, PER), resource consumption, etc.

The illustrated power management subsystem (PMS) 308 provides power to the apparatus, and may include an integrated circuit and or a plurality of discrete electrical components. In the exemplary portable mobile device implementation of the apparatus, the power management subsystem 308 interfaces with a battery, and provides the foregoing logic or algorithms with batter status information in cases where it is required (e.g., where battery depletion is used as a trigger or condition warranting further evaluation).

In some embodiments of the apparatus 300, a user interface system 310 is provided. A user interface may include any number of well-known I/O including, without limitation: a keypad, touch screen or "multi-touch" screen, LCD display, backlight, speaker, and microphone. However, it is recognized that in certain applications, one or more of these components may be obviated. For example, PCMCIA card type mobile device embodiments may lack a user interface (as they could piggyback onto the user interface of the device to which they are physically and/or electrically coupled).

The apparatus may further include optional additional peripherals including, without limitation, one or more GPS transceivers, IrDA ports, USB (e.g., USB 2.0, USB 3.0, Wireless USB, etc.), Fire Wire, Thunderbolt, etc. It is however recognized that these components are not necessary for operation of the apparatus in accordance with the principles of the present disclosure.

Network-Based Variants

Referring now to network-based variants, a "smart" network entity is described which obtains information from the mobile device regarding the aberrant behavior, and evaluates one or more potential causes for the behavior in light of the parameters which it has previously provided. In one variant, the network entity is a base station (e.g., an eNodeB or the like in an LTE network), and is further configured to transmit information to the mobile device regarding the identified causes so that corrective action can be implemented by the mobile. Alternatively, to the extent that it is able to address the problem, the base station may undertake this action.

In yet another variant, the base station obtains information or indication of aberrant behavior regarding a first mobile device from another proximate mobile device, such as regarding RF interference within a given cell occupied by both mobiles. It may be the case that the first mobile device (causing the interference) is operating with incorrect network parameters, which need to be identified or adjusted, but the first mobile device does not recognize (or have the capacity to recognize) that is operating incorrectly.

Example Operation 1

Figure 4:
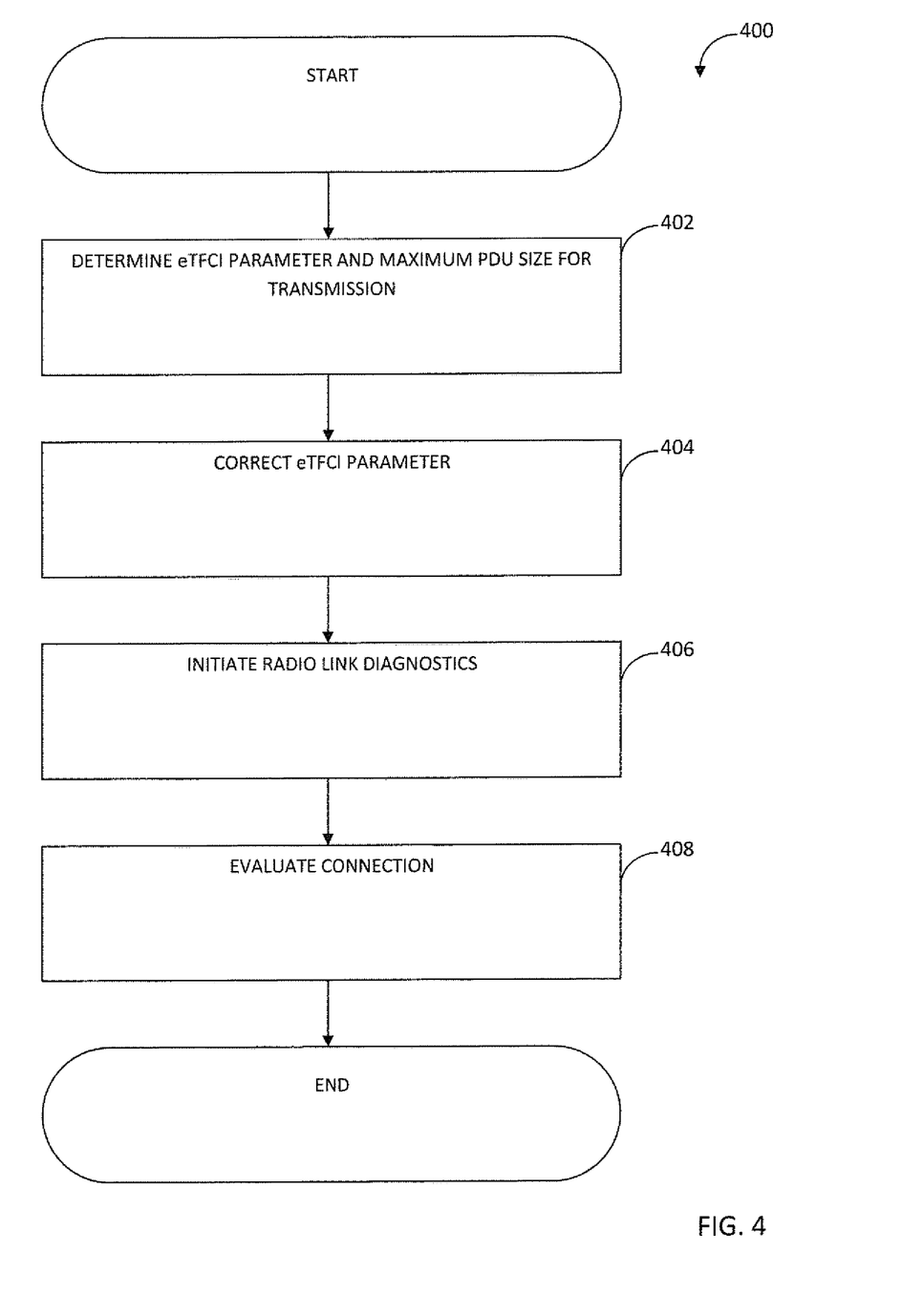
FIG. 4 is a logical flow diagram illustrating one embodiment of a method for managing state behavior in the context of a mobile device connected to a High Speed Packet Access (HSPA) network in limited connectivity conditions.

Referring now to FIG. 4, one exemplary method 400 for managing state behavior in the context of a user equipment (UE) connected to a High Speed Packet Access (HSPA) network in limited connectivity conditions is now described.

In certain conditions of limited connectivity, a UE becomes stuck in a HSPA enhanced dedicated channel (eDCH) state due to incorrect network configuration settings. Specifically, the Minimum-Set-eTFCI (Enhanced Transport Format Combination Indicator) is a parameter set by the network which is used to determine a maximum transport block size allowed under power limited conditions from the UE. Specifically, when a UE selects an eTFCI, the UE's Medium Access Control (MAC) layer software has to ensure that the power headroom available for EDPDCH (eDCH Dedicated Physical Data Channel) transmissions meets the power requirements of the given ETFC. Existing networks require that at each Transmission Time Interval (TTI) boundary, the mobile device (in certain operational states) determines the state of each eTFC for every configured dedicated channel based on its required transmit power versus the maximum UE transmit power. However, existing networks additionally require that the UE always supports eTFCs included in the minimum set of E-TFCs. Thus, if the Minimum-Set-eTFCI is incorrectly configured, the UE will not be able to transmit any RLC PDUs. In some instances, the retransmission diagnostics of the radio link control (RLC) layer of the device may not be activated until at least one PDU is transmitted; in such an instance, this error may be unrecoverable.

As shown in FIG. 4, an application running on the media access control (MAC) layer of the device queries the Minimum-Set-eTFCI setting for the network to determine if the maximum PDU that can be transmitted is below existing RLC PDU limitations for the mobile device (step 402).

At step 404, if the Minimum-Set-eTFCI is below acceptable RLC PDU limitations, the application overrides the setting locally (i.e. on the device) to allow the transmission of one or more PDUs.

At step 406, upon transmission of one PDU, the extant device retransmission diagnostics are activated.

At step 408, using the retransmission diagnostics, the device can evaluate the connection to the base station, and determine if the device should terminate the eDCH state or take other corrective action.

Example Operation 2

Figure 5:
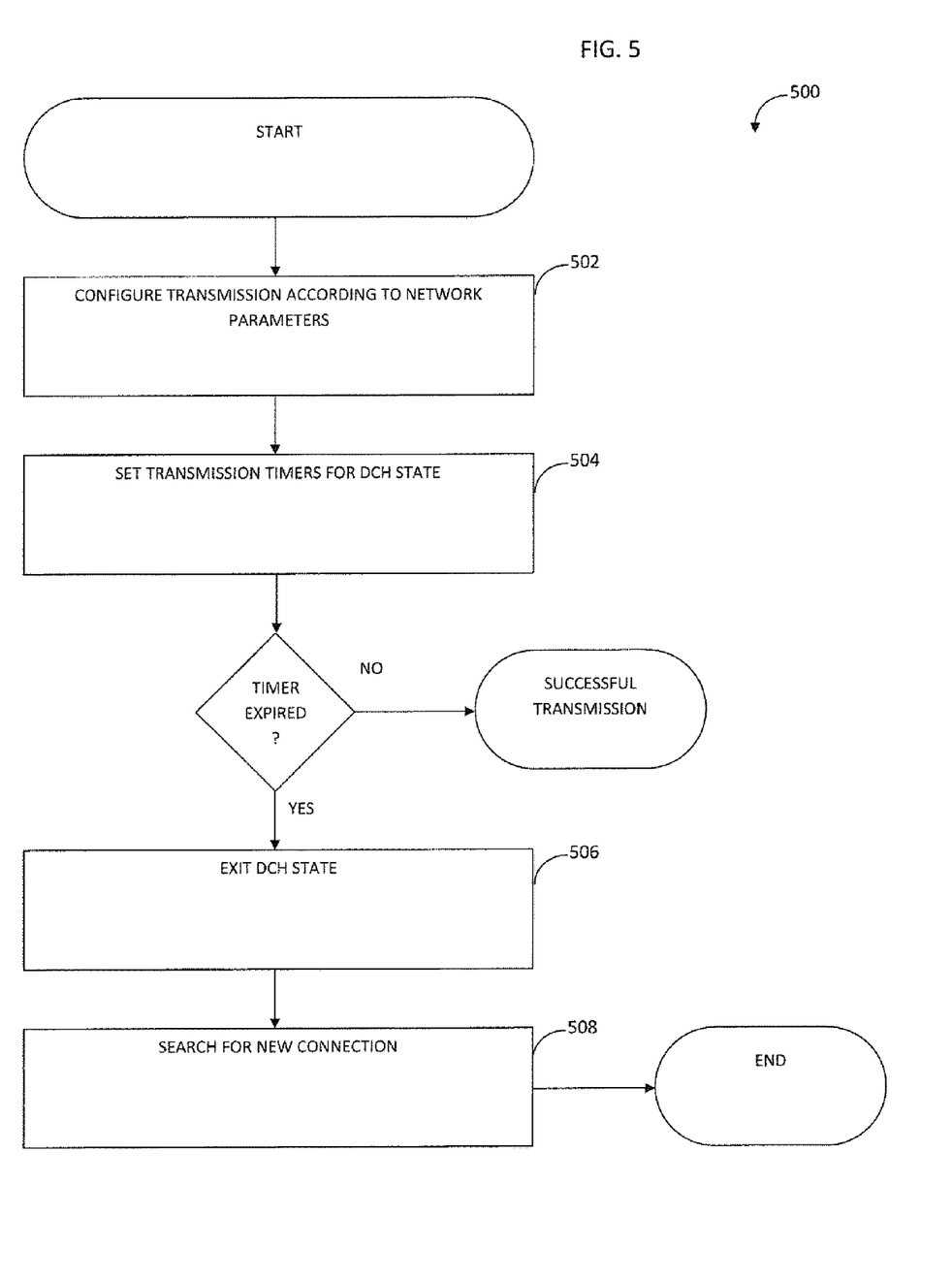
FIG. 5 is a logical flow diagram illustrating one embodiment of a method for managing state behavior in the context of a mobile device connected to a Universal Mobile Telecommunications System (UMTS) network in limited connectivity conditions.

Referring now to FIG. 5, one exemplary method 500 for managing state behavior in the context of a mobile device connected to a Universal Mobile Telecommunication System (UMTS) network in limited connectivity conditions is now described. Similar to the embodiment of FIG. 4, a device may be trapped in a Universal Mobile Telecommunication System (UMTS) dedicated channel (DCH) state.

At step 502 of the method 500, the device has configured its transmissions according to one or more received network parameters. However, unlike the embodiment of FIG. 4, the method 500 does not check the parameter configuration, unless correction is necessary during operation.

At step 504 of the method 500, the device initializes one or more timers during DCH transmission attempts. The timer will expire when the device is held in a DCH state for an abnormally long period of time (thus, indicating a possible deadlocked state).

When one or more timers expire, the device exits the DCH state (step 506) to resolve any deadlocked condition. In some variants, multiple timers are used for different tasks e.g., a first interval when the device is in a particular DCH state, a second interval when the RLC layer has data for transmission in its buffer, a third interval between PDU transmissions, etc. In such variants, the exit condition may require that all timers have expired. For example, if all three timers expire (the first interval for the particular DCH state, the second interval for data held in a buffer, and the third interval for PDU transmissions), the device drops out of the DCH state, and searches for a new connection (step 508).

If the timers do not expire, then the transmission has completed normally (i.e., the device was able to transmit and reset itself according to normal operating procedures).

Example Operation 3

A third exemplary method for managing state behavior in the context of a mobile device connected to a High Speed Packet Access (HSPA) network in limited connectivity conditions is now described.

Consider a mobile device with a forward access channel (FACH) and where the radio conditions prevent the network from receiving random access channel (RACH) messages from the mobile device. When the mobile device attempts a RACH access, and the network is non-responsive, the mobile device will attempt to retransmit the RACH message a number of times. The device will stop retransmissions when a maximum number of retries is reached, or when the network responds to a retransmission. However, if the mobile device is incorrectly set, the mobile device may excessively retransmit the RACH message. Excessive retransmissions generate unnecessary interference and reduce battery life, as well as consuming processing resources on the device.

In one embodiment, the device determines an appropriate number of retransmissions, and ceases retransmissions even if the maximum number of retries specified by the network has not yet been reached. For example, an application running on the medium access layer (MAC) layer of the device may review the network settings, and if the application determines that the number of allowed retries set by the network is too high, reduces the number to an appropriate level. In one variant, the review of network parameters is triggered by a timeout timer, or a number of ACK retransmissions. In other variants, the review of network parameters is performed upon receiving or using the network parameters to configure the maximum number of retries.

In an alternate embodiment, the device determines an appropriate number of retransmissions based on timer expiration. For instance, the device may run a timer from the time of the transmission of the first RACH message. The device then continues to send RACH message retransmissions in accord with its normal schedule. If no response is received from the network before the timer expires, the mobile device ceases transmission of the RACH messages. In some variants, the number of retries (or the timeout duration) may be set relative to the network signal quality parameters (e.g. receive signal code power (RSCP), received signal strength indication (RSSI), etc.). By selecting a number of retries to be commensurate with the channel conditions, the mobile device can reduce excessive retransmission attempts.

It will be recognized that while certain embodiments of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from the contents of the disclosure. The foregoing description is of the best mode presently contemplated. This description is in no way meant to be limiting, but rather should be taken as illustrative of the general principles embodied herein. The scope of the present disclosure should be determined with reference to the claims.

What is claimed is:

1. A method of managing operational states in a user equipment (UE) connected to a High Speed Packet Access (HSPA) network, the method comprising:
at the UE:
receiving from the HSPA network a plurality of network parameters, at least one network parameter of the plurality of network parameters indicating configuration for a maximum medium access control (MAC) transport block size allowed under power limited conditions;
evaluating at least a portion of the received plurality of network parameters to determine whether the at least one network parameter conflicts with a second parameter that indicates configuration for a Radio Link Control (RLC) protocol data unit (PDU) size, the second parameter comprising another one of the plurality of network parameters or a parameter stored by the UE; and
adjusting one or more operational settings of a transmitter of the UE based at least in part on the evaluation to override the maximum MAC transport block size indicated by the at least one network parameter, the adjusting enabling the transmitter to transmit at least one MAC transport block.

2. The method of claim 1, wherein:
the at least one network parameter comprises a Minimum-Set-Enhanced Transport Format Combination Indicator (eTFCI), and
the second parameter comprises an Uplink (UL) RLC PDU size limitation.

3. The method of claim 2, wherein the evaluating comprises determining whether a maximum transport block size specified by the Minimum-Set eTFCI is less than a minimum PDU size specified by the UL RLC PDU size limitation.

4. The method of claim 3, wherein the adjusting one or more operational settings comprises overriding the Minimum-Set-Enhanced Transport Format Combination Indicator (eTFCI).

5. The method of claim 4, further comprising terminating a connection state as part of the adjusting the one or more operational settings of the transmitter of the UE.

6. The method of claim 1, wherein the evaluating comprises evaluating the at least a portion of the received plurality of network parameters against corresponding parameters previously saved in a data structure of the UE.

7. The method of claim 1, wherein the evaluating further comprises evaluating the at least a portion of the received plurality of network parameters against corresponding tolerance values that indicate acceptable parameter values for one or more of the plurality of network parameters, wherein the tolerance values were previously saved in a data structure of the UE.

8. A user equipment device configured to manage operational states, the user equipment device comprising:
a wireless interface configured to:
receive one or more network parameters from a network via a signaling connection; and
based on the one or more network parameters, establish a data connection over which to transact data with the network;
a processor in communication with the wireless interface and a non-transitory computer readable medium; and
the non-transitory computer readable medium comprising one or more instructions that, when executed by the processor, cause the user equipment device to:
review at least a portion of the received one or more network parameters to identify one or more incorrect network parameters that conflict with each other or with a parameter stored by the user equipment device, the one or more incorrect network parameters indicating a configuration for a maximum medium access control (MAC) transport block size allowed under power limited conditions; and adjust one or more operational settings of the established data connection to override the maximum MAC transport block size indicated by the one or more incorrect network parameters.

9. The user equipment device of claim 8, wherein the user equipment device adjusts the one or more operational settings of the established data connection to enable the wireless interface to transmit at least one MAC transport block to the network via the established data connection.

10. The user equipment device of claim 8, wherein the user equipment device reviews the at least a portion of the received one or more network parameters to identify one or more incorrect network parameters by at least comparing the at least a portion of the received one or more network parameters to corresponding network parameters previously saved in a data structure of the user equipment device.

11. The user equipment device of claim 8, wherein the user equipment device adjusts the one or more operational settings of the established connection by at least adjusting a time-out parameter related to an operational state of the user equipment device.

12. A user equipment device configured to correct one or more undesired operational conditions, the user equipment device comprising:

logic configured to obtain a plurality of network parameters from a wireless network;

logic configured to implement at least one network parameter of the obtained plurality of network parameters;

logic configured to identify one or more undesired operational conditions associated with one or more of the implemented at least one network parameter; and logic configured to adjust one or more operational settings of the user equipment device based at least on the identified one or more undesired operational conditions, wherein the one or more undesired operational conditions comprise the user equipment device repeatedly retransmitting a signaling message to the wireless network thereby generating excessive interference, and wherein the logic is configured to adjust the one or more operational settings of the user equipment device by at least limiting retransmissions of the signaling message to less than a maximum specified by the wireless network.

13. The user equipment device of claim 12, wherein adjustment of the one or more operational settings comprises comparing at least a portion of the obtained plurality of network parameters to a set of parameters stored at the user equipment device.

\* \* \* \* \*